Sept. 3, 1957      T. D. RYAN      2,805,067
ELECTRIC WEAPONS
Filed Nov. 19, 1952      2 Sheets-Sheet 1
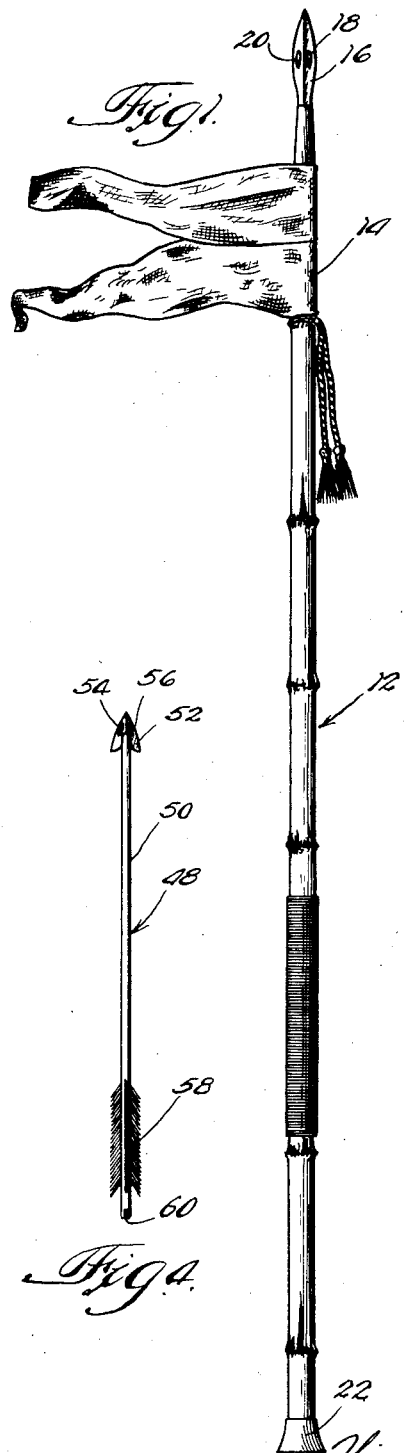
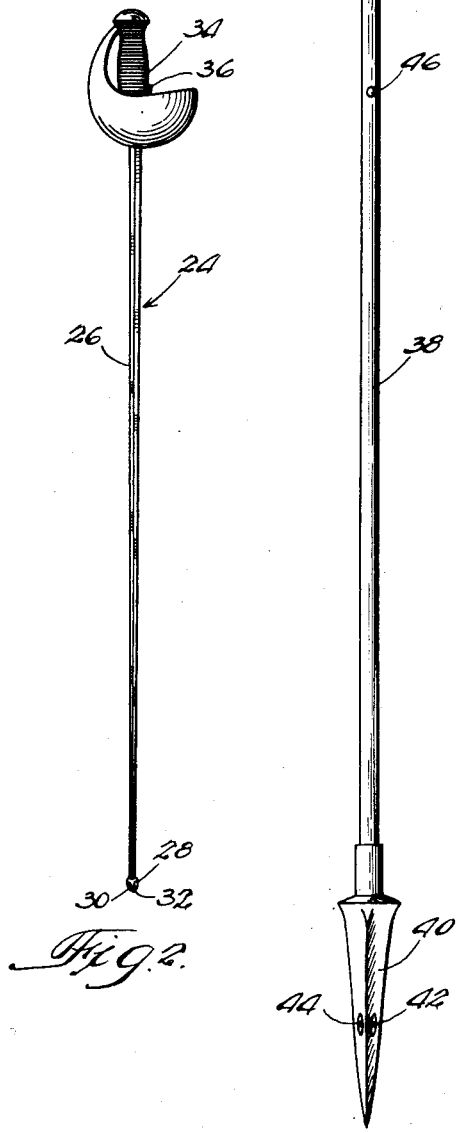
INVENTOR.
Thomas D. Ryan

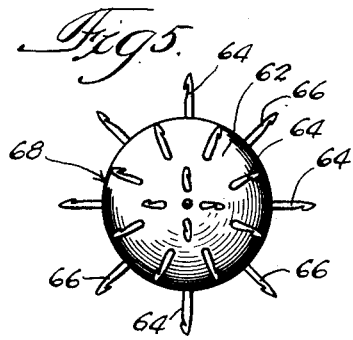
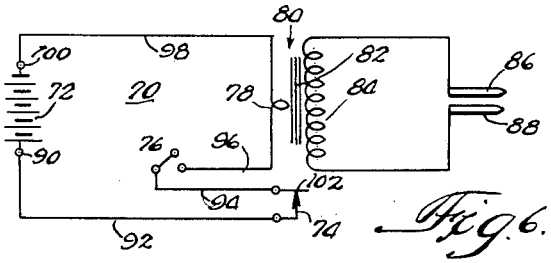
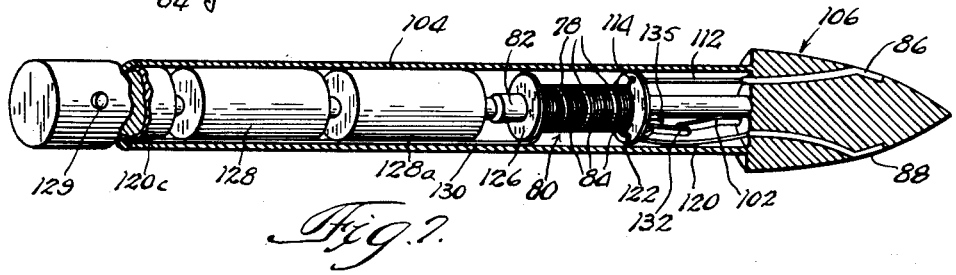
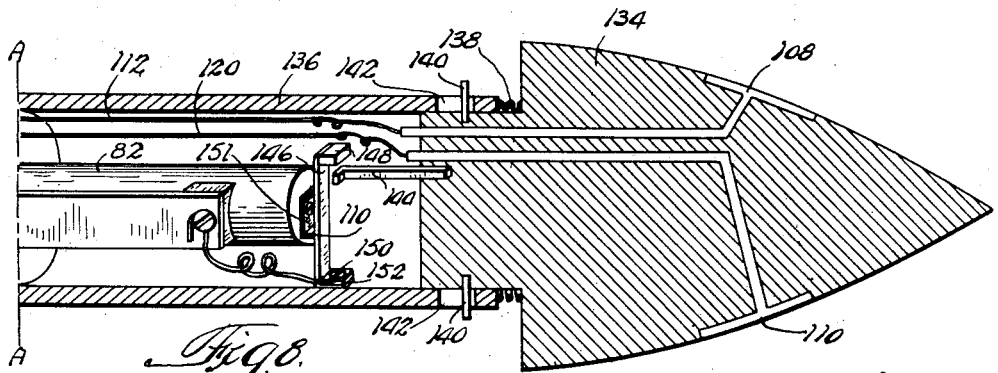
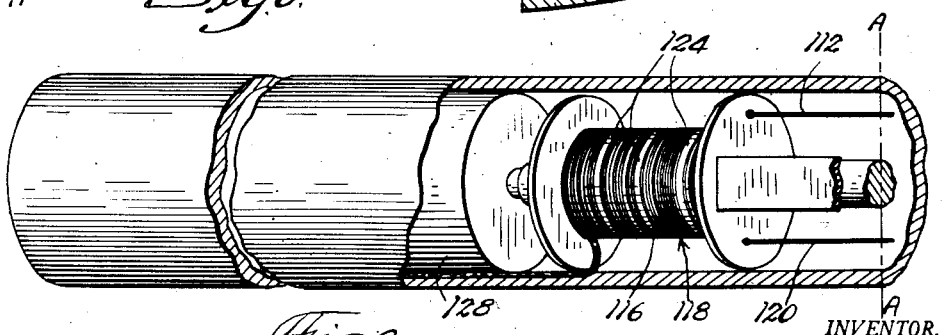

United States Patent Office 2,805,067
Patented Sept. 3, 1957

2,805,067

ELECTRIC WEAPONS

Thomas D. Ryan, Chicago, Ill.

Application November 19, 1952, Serial No. 321,411

2 Claims. (Cl. 273—106.5)

This invention relates to weapons, and more particularly to improved weapons provided with means for producing an electrical stimulus to augment the normal effectiveness of such articles.

It is an important object of this invention to provide novel means for increasing the effectiveness of most weapons heretofore known.

With the advent of gunpowder and various implements of warfare utilizing explosives, technological development of basic weapons has been substantially abandoned. The primitive weapons known in history, such as the lance, arrow, and dart, had certain advantages over the modern weapons generally in use today. In general, weapons consisting primarily of missiles adapted to pierce a foe's body and thus result in injury or death by such impaling have the advantages of low cost and simiplicity of production. Furthermore, such missiles are generally silent and of great value in attacking an adversary where stealth and surprise are desirable factors. An excellent example of a modern application of this type of warfare is the commando-type attack which relies for sucess upon surprise. If in such commando-type attacks a foe can be dispatched quickly and in complete silence an additional element of stealth and surprise is gained which may turn the tide of battle.

This invention provides apparatus by which such commando-type attacks are rendered more effective utilizing basic nonexplosive-type missiles in combination with an electrical system carried thereby. By incorporating in a missile an electrical system such as one consisting of a plurality of dry cells, an interrupter, an induction coil, and a pair of electrodes, as hereinafter described, an electrical stimulus can be applied to an adversary of sufficient magnitude to produce severe traumatic or lethal effects.

Animal physiology is such that an electrical stimulus applied to the nervous system of various animals will produce varying results, depending upon the point of contact, the magnitude of the electrical stimulus applied, and the complexity of the animal's nervous system. Various traumatic effects have been observed such as fibrillation in the muscular structure of the vital organs, whereby all rhythm and pattern of muscular activity is destroyed and consequently breathing and normal circulation are interrupted. If an electrical stimulus is applied to a nonvital organ, whereby none of the vital processes are interrupted, the electrical signals may be made sufficient to cause severe muscle spasms and locally destroy independent control of these muscles by the normal mental processes.

Therefore it is a further object of this invention to provide an improved weapon which will produce the normal effects of missile-type weapons heretofore known combined with a severe electric shock.

It is a further object of this invention to provide apparatus which will produce a controllable electrical stimulus capable of producing lethal effects or merely irritating traumatic effects. Such weapons have obvious practical applications in warfare, as discussed above, but will be of equal value to the hunter who has experienced the difficult situation of striking with a rifle projectile or arrow a nonvital organ in a dangerous prey, only to find that the prey, thus injured and enraged, charges upon the hunter, thus putting his very life in jeopardly. Such a circumstance will not arise when utilizing the subject of this invention, as upon striking the nonvital areas of such prey the missile will first injure said prey by piercing its body in the usual manner and then will produce continued involuntary muscle spasms in the pierced area whereby the prey will be unable either to charge or flee. Thus a method of hunting is provided which will produce quicker and more humane dispatch of the hunted.

It is another object of this invention to provide electrical missiles adapted to other applications which will quickly become apparent to one skilled in the art, such as harpoons, fishing spears, fishhooks, muzzle or hand-thrown grenade-type missiles, or land mines. It is intended that all of these embodiments are included within the spirit and scope of this invention and encompassed within the appended claims.

Other objects and advantages of the invention will appear from a consideration of the following detailed specification.

Accordingly, for a more complete understanding of the invention, reference is made to the accompanying drawings, in which—

Figure 1 illustrates one embodiment of this invention as applied to a lance;

Fig. 2 shows the teaching of this invention incorporated in a fencing foil;

Fig. 3 is an elevational view showing the teaching of this invention applied to a spear;

Fig. 4 illustrates another embodiment showing the teaching of this invention applied to an arrow;

Fig. 5 shows a fifth embodiment of this invention adapted for use as a hand-thrown missile or land mine;

Fig. 6 is a schematic circuit diagram of the electrical portions of this invention;

Fig. 7 is a view, partially in section, showing the internal construction of one embodiment of this invention;

Fig. 8 illustrates in section the forward portions of a second embodiment of this invention; and Fig. 9 is an illustration, partially in section, of the rearward portion of the embodiment of Fig. 8.

Referring now to the drawings, and more particularly to Figs. 1–5, several of the possible embodiments of this invention are shown.

The lance 12 of Fig. 1 is typical of that currently carried and used by a segment of the world's population today. The lance 12 carries a banner 14 and has a metallic point 16 at its forward end sharpened in a manner adapted for piercing any foe encountered. In accordance with this invention a pair of electrodes 18, 20 are embedded in the point 16 and are electrically insulated therefrom. These electrodes are energized with a series of high voltage electrical impulses from apparatus contained in the body portion of the lance 12, as will be subsequently described. The knob 22 provided at the rearward end of the lance 12 contains switch means whereby relative rotation of the lance 12 and knob 22 will control energization of the electrodes 18 and 20.

A second embodiment of this invention is shown in Fig. 2 wherein the circuit and electrodes are applied to a fecing foil 24. The fencing foil has a flexible shaft portion 26 terminating in a nib 28 constructed preferably of an insulating material and having a pair of electrodes 30, 32 extending therefrom. Each of the electrodes 30 and 32 has an electrical conductor associated therewith which passes through a central bore in the shaft 26 and is connected to electrical circuit apparatus contained within the handle 34 of the foil. A push button 36 is provided on the handle 34 to control energization of the electrodes 30 and 32 as desired by the fencer who is holding the foil. The electrode elements 30 and 32, while not designed primarily for the purpose of piercing an adversary's skin, should be sufficiently pointed to insure penetration of the outer garments and contact with the body portions of a foe and should extend somewhat beyond the insulated nib 28.

The spear shown in Fig. 3 is typical of the type used in game hunting and comprises a hollow shaft portion 38 having a pointed head 40 in which a pair of electrodes 42 and 44 are embedded. The electrodes 42 and 44 should be electrically independent and insulated from the spear head 40. Each electrode has an electrical conductor connected from said electrode to electrical circuit apparatus contained within the shaft 38. A push button 46 is provided on the shaft 38 whereby energization of the electrodes 42 and 44 is controlled.

Fig. 4 illustrates the teaching of this invention as applied to a broad-head arrow 48. The arrow 48 has a hollow shaft 50 on which a broad head 52 is mounted. A pair of electrodes 54 and 56 are secured in the broad head 52 and are electrically isolated from the broad head and from each other. The other end of the shaft 50 is provided with the conventional feathers 58 to insure steady, straight flight and a notch 60 engageable by the customary bow utilized in projecting such an arrow through space. Again, the electrodes 54 and 56 are energized by electrical circuitry contained within the hollow shaft 50. The electric arrow herein shown utilized in conjunction with a cross bow creates a weapon of greatly increased lethal potentialities.

The embodiment of Fig. 5 comprises a spheroid 62 which contains all of the electrical apparatus necessary to produce high voltage electrical stimulae and from which extend a plurality of barbed electrodes 64 and 66. The electrodes 64 and 66 are connected to the high voltage output of the electrical apparatus contained within the spheroid 62, as will be explained more completely below. The barbed electrodes 64 are energized from one terminal of a high voltage transformer secondary, while the alternate barbed electrodes 66 are energized from the other terminal of said high voltage transformer secondary. By such arrangement of electrodes, irrespective of the position in which the missile 68 is thrown or lies, it will be in a position to produce the desired electrical effects upon all bodies coming in contact with the barbed electrodes.

Thus, five possible embodiments are here shown in which the combined effects of piercing and electrical stimulus are utilized to produce weapons of unusual efficacy capable of dispatching an adversary with greatly improved speed and efficiency. The fencing foil of Fig. 2 would utilize an electrical circuit adapted to produce a voltage less than that necessary to produce lethal effects. The use of a fencing foil incorporating the teaching of this invention will be effective to greatly increase the interest and enthusiasm which is shown in the art and sport of fencing. A new incentive will be provided for avoiding the touche of an opponent while providing an additional incentive to defeat an opponent, thus inflicting the electrical stimulus upon him. In addition to the embodiments shown, the teaching of this invention includes the application of electric stimulus apparatus to a harpoon, whereby the whaling industry will have a weapon of increased efficiency for quickly dispatching a whale, once it has been impaled, by passing an electrical current through its body and vital organs.

It is also intended by this disclosure to teach the use of a pair of electrodes incorporated into a fishing hook and connected by electrical conductors to a "sinker" or "bobber" which will contain the electrical circuitry necessary to energize such electrodes in the fishhook. In order to conserve the life of the electrical components, a switch is provided whereby no electrical current is applied to the fishhook electrodes until a strike causes tension in the connecting member between the fishhook and bobber, at which time the switch mechanism is closed and the hook electrodes energized.

Referring now to Fig. 6, a circuit 70 is shown which provides a source of relatively low voltage 72, such as a plurality of dry cells connected in series, or a completely sealed storage battery. The terminals of the voltage source 72 are connected through a single pole, single throw switch 76 and normally closed switch 74 to a primary winding 78 of an induction coil 80. The induction coil 80 is preferably constructed having an iron core 82 on which the primary winding 78 and a secondary winding 84 are concentrically wound. In amplifying dry cell voltages it is necessary to have an efficient electromagnetic system in order to produce the desired high voltages and currents necessary to produce lethal electrical characteristics. Therefore, the primary winding 78 should be of very few turns and constructed of a relatively large diameter conductor. The secondary winding 84, on the contrary, is wound of relatively fine wire and has a large number of turns. The ratio of primary to secondary turns should be of the order of 1:1000. The output terminals of the secondary winding 84 are connected to a pair of electrodes 86, 88 which may be any of the electrodes shown and described in the various embodiments discussed above.

In the primary circuit a complete electrical path is established from the positive terminal 90 of the voltage source 72 through a conductor 92, the normally closed switch 74, conductor 94, the manually operated switch 76, conductor 96, the primary 78 of the induction coil 80, conductor 98, and the negative terminal 100 of the voltage source 72. The normally closed switch 74 is operatively associated with the iron core of the induction coil 80. When the induction coil 80 is energized by a current flowing through the above-described circuit, the movable contact 102 of the normally closed switch 74 is attracted to the iron core 82 and the primary circuit is thereby opened. This will allow deenergization of the induction coil 80 and consequent release of the movable contact 102, which will once again complete the primary circuit, and by repeated action of this type an oscillatory or intermittent current is produced in the primary circuit. This will cause the induction coil 80 to function as a high voltage transformer and will thus produce an intermittent high voltage between the electrods 86 and 88 in the high voltage circuit. The exact magnitude of the secondary voltage will be determined by the turns ratio of the induction coil 80 and the voltage of the cells 72. A typical arrangement which has been found to be satisfactory utilizes a 6-volt primary source and a 1000:1 turns ratio which produced a voltage of approximately 4000 volts across the electrodes 86 and 88.

The single pole switch 76 is provided to manually control energization of the primary circuit and will generally be mounted for manipulation by a person who is utilizing any of the embodiments above described. As will be described with respect to Figs. 8 and 9, the normally closed switch 74 may be eliminated and the normally open switch 76 may be mounted for oscillatory operation under the influence of a spring-mass system. Other switch arrangements within the scope of this invention will be available to one skilled in the art.

One possible system of mounting the circuit elements described with respect to Fig. 6 is shown in the arrangement of Fig. 7. Therein a hollow shaft 104 is shown with a broad head 106 mounted at one end thereof. The broad head 106 is preferably composed of some insulating material such as a molded plastic and contains a pair of metallic electrodes 86, 88 embedded therein. While the broad head 106 is here shown as constructed of an insulating material, it should be understood that a metallic head may be provided requiring only that the electrodes mounted therein are electrically insulated from the head portion. A flexible conductor 112 is connected from the electrode 86 to one terminal 114 of the high voltage winding 84 of the transformer 80. The other electrode 88 is connected through a flexible conductor 120 to the second high voltage terminal 122 of the winding 84. The high voltage winding 84 and the low voltage winding 78 are concentrically wound on an insulating spool 126 having a central axial iron core 82. Coaxial with the iron core 82 are a plurality of dry cells 128 constituting the primary voltage source 72 extending rearwardly into the hollow shaft 104. By positioning the successive dry cells 128 in end-to-end relationship, a completed series connection is established, as is known in the art.

A manually operated button type switch 76 having a button 129 is provided behind the last of the series of dry cells 128 and is adapted to complete the primary circuit. A contact is thereby established between the bottom plate of the last dry cell 128c and a conductor 130 which runs the entire length of the shaft 104 to complete the primary circuit to one terminal of primary winding 78. The hollow shaft 104 may be constructed of a metallic material, thus eliminating the need for the conductor 130 above described. The primary circuit is completed from the forward end of the first dry cell 128a through the iron core 82 to a magnetic leaf contact 102 and a nonmagnetic leaf 132 which is connected to the other terminal of the primary winding 78. Nonmagnetic contact 132 is mounted on insulated spacer 135. The primary circuit is normally completed through juxtaposed contacts 102 and 132. Upon buildup of a magnetic field in the iron core 82 the magnetic leaf contact 102 is attracted thereto and the primary circuit is opened. This will produce the oscillatory or intermittent primary current discussed with respect to Fig. 6.

A hunter or warrior, in utilizing the spacer shown in Fig. 7, would, upon sighting a prey, depress the button 129 on the normally open switch to energize the electrical portions of the weapon. The switch contacts will remain closed until released by a second depression of the push button 129. He would then launch the weapon, and upon impaling the prey with the broad head 106 an electrical circuit is completed through the high voltage winding 84, the electrode 86, the body of the prey, and back to the electrode 88. This will produce the various traumatic effects discussed above.

When employing the electrical circuitry herein described in arrows or other relatively small structures, it will be necessary to use voltage sources having relatively small energy capacities. It is therefore desirable that such devices be electrically energized only upon striking a prey and not during flight or nonuse.

Such a system is shown in the disclosure of Figs. 8 and 9. The circuit utilized in this embodiment differs from that shown in Fig. 6. The manually operated switch shown in Fig. 6 has been eliminated, and the normally closed magnetically operated interrupter 74 of Fig. 6 has been replaced by a normally open mechanically operated interrupter 110. The interrupter 110 comprises a fixed contact 151 and a resilient movable contact 146 mounted as a cantilever on the hollow shaft 136. The movable contact 146 is secured to an insulated base 152 by screw 150. A large mass 148 is suspended at the free end of the cantilever to produce sustained oscillatory pendulum-like motion when initially excited. In Fig. 8 a broad head 134 is mounted on a hollow shaft 136 whereby the broad head 134 is reciprocable and supported in an extended position by the pressure of a compressed coil spring 138. The motion of the broad head 134 is limited by a pair of stop pins 140 slidably engaged in slots 142 formed in the hollow shaft 136. The broad head has mounted therein a pair of electrodes 108 and 110 with flexible conductors 112 and 120 extending rearwardly therefrom, said conductors being connected to a high voltage winding 116 forming the high voltage secondary circuit. The primary circuit of this embodiment comprises a plurality of dry cells 128 axially aligned and serially connected, the normally open switch 110, and the primary winding 124 of the transformer 118.

When the broad head 134 strikes any object it will cause compressing of the coil spring 138 and consequently relative axial movement of the hollow shaft 136 and the broad head 134. This will cause detent 144 which is secured in the broad head 134 to engage the relatively long spring contact 146 which is a part of the normally open switch 110.

Upon engagement of the spring contact 146 by the detent 144 it will be stressed to produce pivotal motion about the mounting base 152 and consequently to complete the circuit by contact with fixed contact 151. The resilient character of spring contact 146 in combination with the mass 148 will cause continued oscillatory motion of the spring contact 146 about its mounting base 152 and will thus produce a series of circuit closures, the frequency of which is determined by the relationship of the spring constant of the contact 146 and the magnitude of the mass 148. This continued oscillation will, if the components are properly chosen, be sufficient to produce the desired traumatic results upon the prey resulting from intermittent energization of the primary circuit with a series of direct current pulses which will in turn produce a series of high voltage electrical pulses between the electrodes 108 and 110.

It will be immediately apparent that various combinations of the switch arrangements and circuit components herein described may be effected without departing from the spirit and scope of this invention. Furthermore, various combinations of series and parallel dry cells may be mounted within the missile shafts, various primary to secondary turns ratios may be employed in the transformer, and various electrode structures may be employed by one skilled in the art. As an example, it is possible to mount a single electrode in the broad head and a second electrode on the shaft of the missile whereby a relatively long electrical path is produced through the body impaled. It may be desirable in the alternative to provide a single insulated electrode in the broad head and construct the broad head of a conducting material, utilizing it as the second electrode. It may be desirable to mount a plurality of missiles on a single shaft as in the triton or provide an additional spring-loaded missile carried by a primary missile, and these are considered clearly within the scope of this invention.

In addition to missile-type weapons this invention may readily be applied to knives, sabers, bayonets, and other hand-held weapons.

The particular weapon embodiment built in accordance with this invention may have value predicated on either the lethal, traumatic, or psychological effects that the presence of the electric stimulus may produce. Thus the mere existence of these electrified weapons may produce a psychological effect of great value on the battle field.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:
1. A weapon for immobilizing animals comprising means for piercing the outer surface of such an animal, electrode means secured on the periphery of said weapon in the region of said piercing means, a low voltage source of electricity mounted within said weapons, voltage amplifier means mounted within said weapon and connected to said low voltage source for energization thereby, and circuit interrupter means comprising a fixed electrical contact, a resiliently mounted electrical contact mounted in spaced relationship to said fixed contact, a predetermined mass secured to said resiliently mounted contact, and detent means engageable with said resiliently mounted contact whereby impact with such an animal causes said detent to engage said resiliently mounted contact and causes intermittent interruption of the electrical connection between said low voltage source and said voltage amplifier means, said voltage amplifier means being electrically connected to said electrode means whereby such an animal is immobilized by the combined effect of said piercing means and the high voltage applied to said electrodes.

2. A weapon for immobilizing animals comprising an elongate body portion, means for piercing the outer surface of such an animal mounted on said body portion for axial movement relative thereto, spaced electrode means mounted in the piercing means, a low voltage source of electricity mounted within said body portion, voltage amplifier means mounted within said body portion and connected to said low voltage source for energization thereby, and circuit interrupter means comprising a fixed electrical contact, a resiliently mounted contact in spaced relationship to said fixed contact, a predetermined mass secured to said resiliently mounted contact, and detent means engageable with said resiliently mounted contact and actuated by relative movement of said body and said piercing means, whereby impact with such an animal causes said detent to engage said resilient contact and causes intermittent interruption between said low voltage source and said voltage amplifier means, said voltage amplifier means being electrically connected to said electrode means whereby such an animal is immobilized by the combined effect of said piercing means and the high voltage applied to said electrodes.

References Cited in the file of this patent

UNITED STATES PATENTS

| | | |
|---|---|---|
| 1,283,772 | Holtzman | Nov. 5, 1918 |
| 1,651,499 | Woodrow | Dec. 6, 1927 |
| 1,891,493 | Apostoloff | Dec. 20, 1932 |
| 2,262,040 | Pell | Nov. 11, 1941 |
| 2,304,065 | Wright | Dec. 8, 1942 |
| 2,484,147 | Bartel | Oct. 11, 1949 |

FOREIGN PATENTS

| | | |
|---|---|---|
| 767,898 | France | May 7, 1934 |